US005722141A

United States Patent [19]

Strickland

[11] Patent Number: 5,722,141

[45] Date of Patent: Mar. 3, 1998

[54] FASTENER RETAINER REMOVAL TOOL

[75] Inventor: Elliotte Strickland, San Diego, Calif.

[73] Assignee: The United States of America as represented by the Secretary of the Navy, Washington, D.C.

[21] Appl. No.: 679,688

[22] Filed: Jul. 11, 1996

[51] Int. Cl.$^6$ .......... B23P 19/04

[52] U.S. Cl. .......... 29/267; 254/21; 254/25

[58] Field of Search .......... 254/21, 25; 29/267, 29/270, 278

[56] References Cited

U.S. PATENT DOCUMENTS

| | | | |
|---|---|---|---|
| 466,066 | 12/1891 | Sheldon | 254/25 |
| 1,195,143 | 8/1916 | McDonald | 29/270 |
| 1,445,514 | 2/1923 | Johnson | 254/21 |
| 2,103,008 | 12/1937 | Kinast | 254/21 |
| 2,898,674 | 8/1959 | Anderson | 29/278 |
| 4,392,264 | 7/1983 | Booe, Jr. | 29/267 |
| 4,509,242 | 4/1985 | Marra | 29/267 |
| 5,438,743 | 8/1995 | Simington et al. | 29/267 |
| 5,495,651 | 3/1996 | Tsuha | 29/267 |

FOREIGN PATENT DOCUMENTS

| | | | |
|---|---|---|---|
| 142837 | 11/1953 | Sweden | 254/21 |
| 0910503 | 3/1982 | U.S.S.R. | 29/270 |

*Primary Examiner*—Robert C. Watson
*Assistant Examiner*—Thomas W. Lynch
*Attorney, Agent, or Firm*—Harvey Fendelman; Michael A. Kagan; Eric James Whitesell

[57] ABSTRACT

A fastener retainer removal tool comprises a handle, a shank extending from the handle, and a tip at the distal end of the shank. The tip has a narrow portion and a wide portion divided by a slot that is tapered outward on one side. The other end of the slot is enlarged to hold a workpiece inside the slot. The narrow portion of the tip is used for guiding safety wire and cotter keys into the slot. The wide portion of the tip is used as a lever to assist in bending thick cotter keys.

5 Claims, 3 Drawing Sheets

FASTENER RETAINER REMOVAL TOOL

BACKGROUND OF THE INVENTION

The present invention relates to hand tools for mechanical assembly and maintenance. More specifically, but without limitation thereto, the present invention relates to a screwdriver adapted to removing safety wire and cotter keys from bolt fasteners.

Several hand tools are used for removing safety wire and cotter pins from fasteners commonly used in aircraft and other machinery. Examples of such tools are diagonal cutters, needle nose pliers, duckbill pliers, scribes, awls, and in some cases hammer and chisel. Some disadvantages of these tools are that often more than one tool is required and that often there is not enough space around the fastener to operate these tools. Accordingly there exists a continuing need for a single tool that can manipulate safety wire and cotter keys in confined spaces.

SUMMARY OF THE INVENTION

The fastener retainer removal tool of the present invention is directed to overcoming the problems described above, and may provide further related advantages. No embodiment of the present invention described herein should be construed to preclude other embodiments or advantages that may exist or become obvious to those skilled in the art.

The fastener retainer removal tool of the present invention comprises a handle, a shank extending from the handle, and a tip at the distal end of the shank. The tip has a narrow portion and a wide portion divided by a slot that is tapered outward on one side forming the narrow portion. The other end of the slot is enlarged to hold a workpiece inside the slot. The narrow portion of the tip is used for guiding safety wire and cotter keys into the slot. The wide portion of the tip is used as a lever to assist in bending thick cotter keys.

An advantage of the fastener retainer removal tool is that safety wire and cotter keys may be removed with a single tool, saving the time needed to switch from one tool to another.

Another advantage is that safety wire and cotter keys may be removed from confined spaces.

The features and advantages summarized above in addition to other aspects of the present invention will become more apparent from the description, presented in conjunction with the following drawings.

DESCRIPTION OF THE INVENTION

The following description is presented solely for the purpose of disclosing how the present invention may be made and used. The scope of the invention is defined by the claims.

Figure 1:
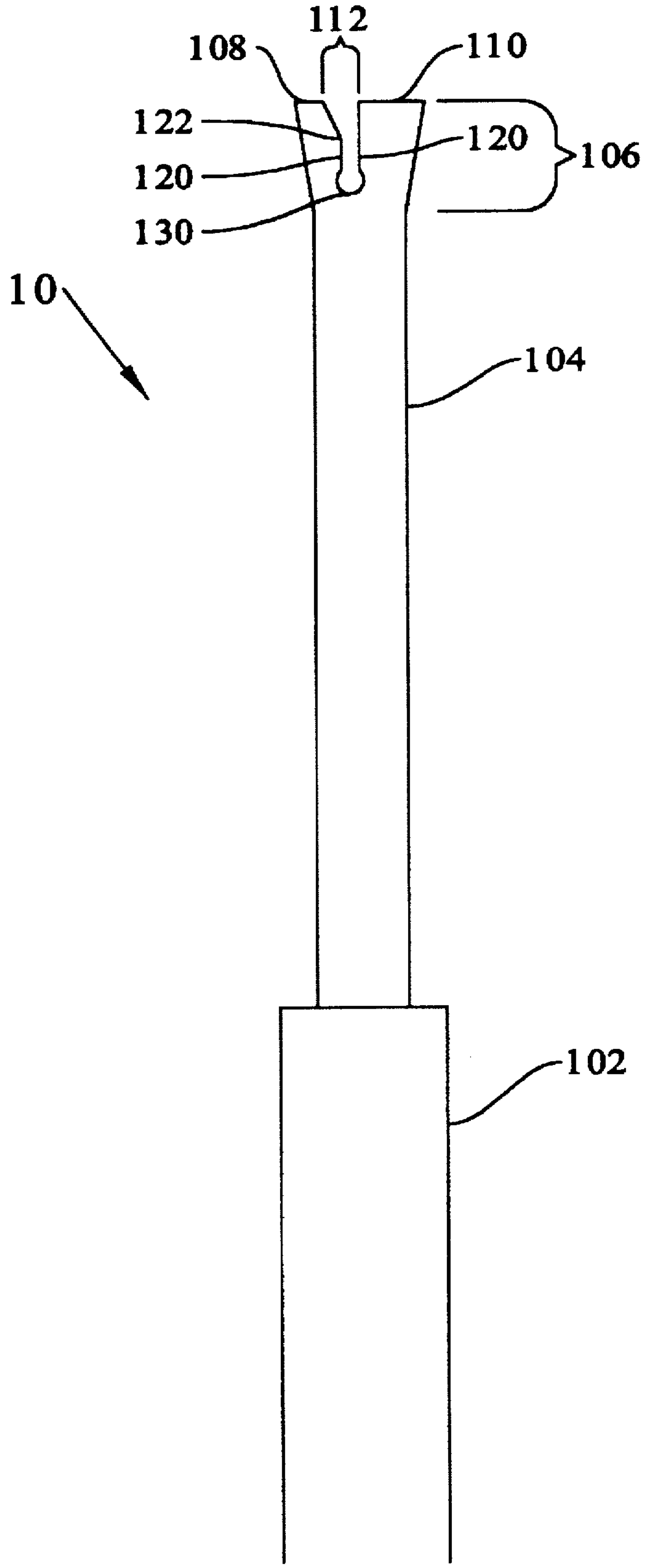
FIG. 1 is a side view of the fastener retainer removal tool.
Figure 3:
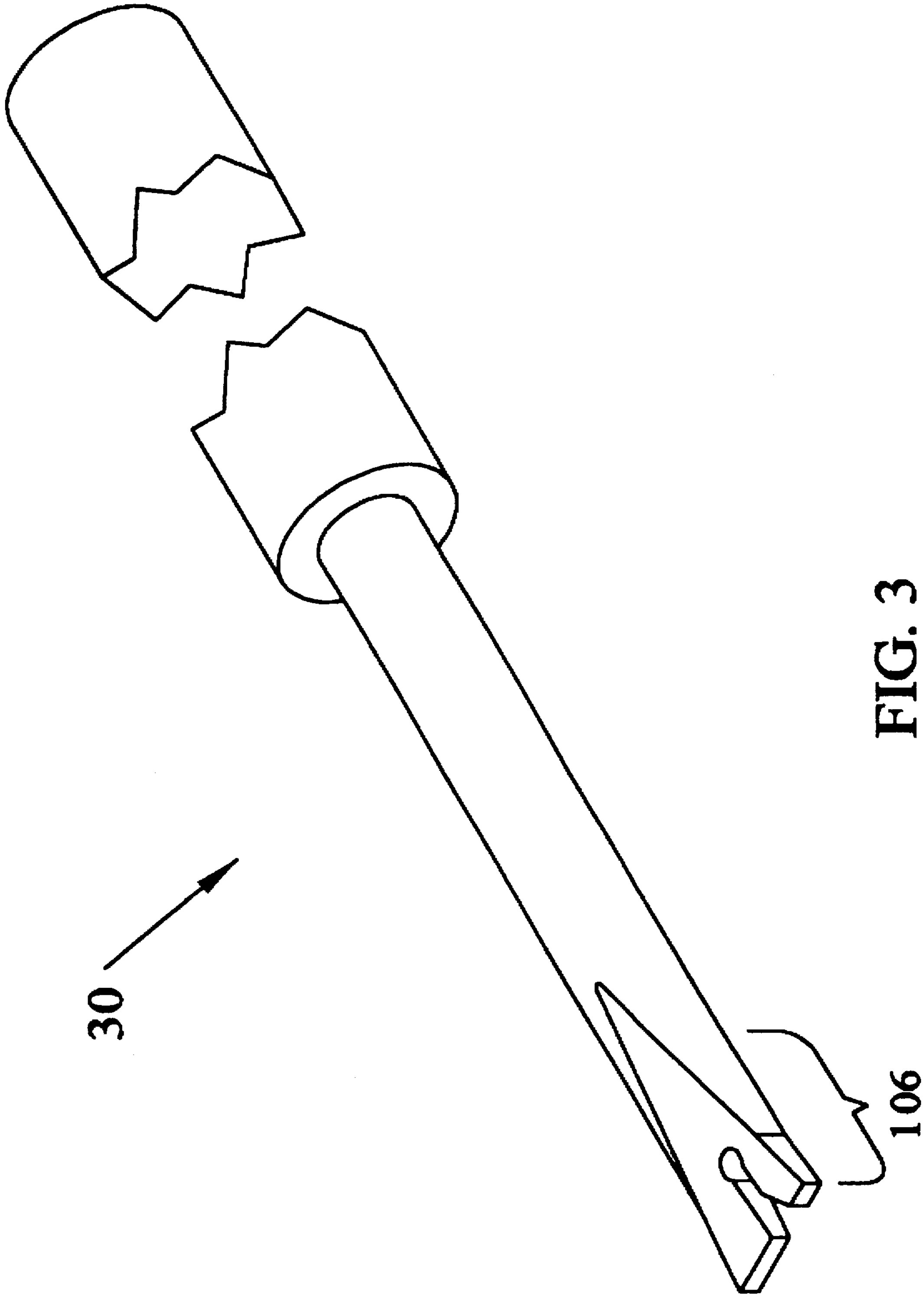
FIG. 3 is a perspective view of the fastener retainer removal tool.

In FIG. 1, a fastener retainer removal tool 10 comprises a handle 102, a shank 104, and a blade tip 106. Fastener retainer removal tool 10 may be made from, for example, a flat blade screwdriver by forming blade tip 106 in screwdriver 30 as shown in FIG. 3. Blade tip 106 comprises a narrow portion 108 and a wide portion 110 divided by a slot 112. Slot 112 extends from a closed end 130 between two parallel sides 120 to a point where one side tapers outward from a point 122 into narrow portion 108. The other end 130 of slot 112 is enlarged to hold workpieces securely in slot 112 during operation.

Figure 2:
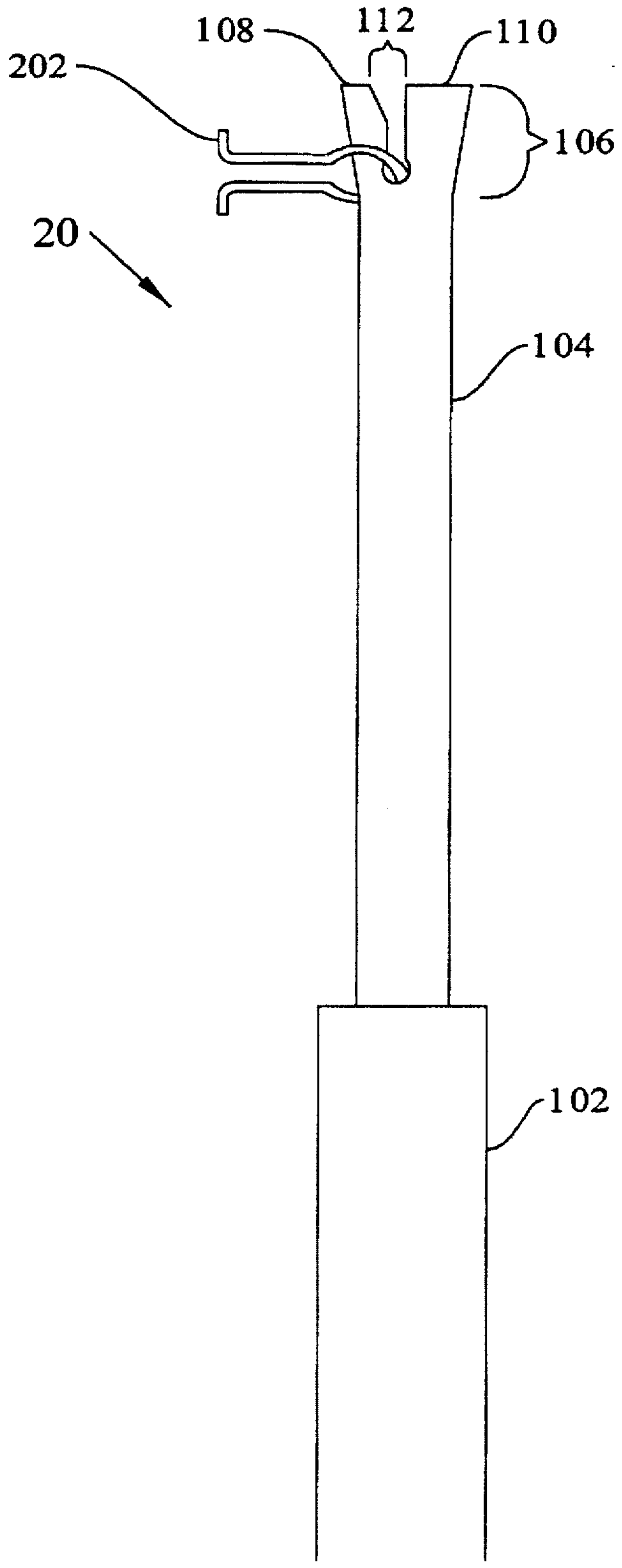
FIG. 2 is a side view of the fastener retainer removal tool engaging a cotter key.

FIG. 2 shows fastener retainer removal tool 20 used to remove a cotter key 202. Cotter key 202 is engaged over narrow portion 108 into the enlarged portion of slot 112. Handle 102 may be twisted to engage wide portion 110 for leverage to assist in the removal of cotter key 202.

Other modifications, variations, and applications of the present invention may be made in accordance with the above teachings other than as specifically described to practice the invention within the scope of the following claims.

I claim:

1. A fastener retainer removal tool comprising:

a handle;

a shank coupled to said handle; and a blade tip formed in a distal end of said shank wherein said blade tip comprises a single narrow portion and a single wide portion divided by a single slot having a single open end and an opposite single closed end for engaging a workpiece, wherein said slot has a first portion wherein only two substantially parallel, straight sides extend substantially parallel to said shank along a distance from said closed end, and wherein said slot has a second portion wherein a first of said sides tapers obliquely away from a second of said sides along a substantially straight line to form said narrow portion of said blade tip at said open end of said slot, and said second of said sides continues along a substantially straight line to form said wide portion of said blade tip at said open end of said slot.

2. The fastener retainer removal tool of claim 1 wherein said slot has an enlarged end for holding said workpiece engaged in said slot.

3. The fastener retainer removal tool of claim 1 wherein said blade tip is tapered from said shank to a substantially flat shape.

4. The fastener retainer removal tool of claim 1 wherein said workpiece is safety wire.

5. The fastener retainer removal tool of claim 1 wherein said workpiece is a cotter key.

* * * * *